(12) United States Patent
Chen et al.

(10) Patent No.: US 9,799,887 B2
(45) Date of Patent: Oct. 24, 2017

(54) BATTERIES AND CATHODES CONTAINING CARBON NANOTUBES

(71) Applicant: Medtronic, Inc., Minneapolis, MN (US)

(72) Inventors: Kaimin Chen, Shoreview, MN (US); Gaurav Jain, Edina, MN (US)

(73) Assignee: Medtronic, Inc., Minneapolis, MN (US)

( * ) Notice: Subject to any disclaimer, the term of this patent is extended or adjusted under 35 U.S.C. 154(b) by 594 days.

(21) Appl. No.: 14/261,573

(22) Filed: Apr. 25, 2014

(65) Prior Publication Data

US 2015/0311532 A1 Oct. 29, 2015

(51) Int. Cl.
*H01M 4/62* (2006.01)
*H01M 6/16* (2006.01)
*H01M 4/06* (2006.01)
*H01M 4/38* (2006.01)
*H01M 4/583* (2010.01)
*H01M 4/54* (2006.01)
*H01M 4/36* (2006.01)
*H01M 4/48* (2010.01)
*H01M 4/50* (2010.01)
*H01M 4/58* (2010.01)

(52) U.S. Cl.
CPC ............. *H01M 4/625* (2013.01); *H01M 4/06* (2013.01); *H01M 4/364* (2013.01); *H01M 4/382* (2013.01); *H01M 4/54* (2013.01); *H01M 4/5835* (2013.01); *H01M 6/16* (2013.01); *H01M 4/48* (2013.01); *H01M 4/502* (2013.01); *H01M 4/582* (2013.01)

(58) Field of Classification Search
None
See application file for complete search history.

(56) References Cited

U.S. PATENT DOCUMENTS

| | | | |
|---|---|---|---|
| 5,180,642 A | 1/1993 | Weiss et al. | |
| 5,667,916 A * | 9/1997 | Ebel .................... | H01M 4/36 429/219 |
| 6,842,328 B2 | 1/2005 | Schott et al. | |
| 2005/0227146 A1 | 10/2005 | Ghantous et al. | |
| 2008/0038643 A1 * | 2/2008 | Krehl ................. | H01M 4/133 429/322 |
| 2010/0196765 A1 | 8/2010 | Palazzo et al. | |
| 2011/0184483 A1 | 7/2011 | Norton et al. | |

OTHER PUBLICATIONS

Li et al., "The Improved Discharge Performance of Li/CFx Batteries by Using Multi-Walled Carbon Nanotubes as Conductive Additive", Journal of Power Sources, 196 (2011) 5 pages.
Bock et al., "Batteries Used to Power Implantable Biomedical Devices", National Institute of Health, NIH-PA Author Manuscript, Dec. 31, 2012, 31 pages.

* cited by examiner

Primary Examiner — Maria Laios
Assistant Examiner — Robert S Carrico

(57) ABSTRACT

Cathodes containing active materials and carbon nanotubes are described. The use of carbon nanotubes in cathode materials can provide a battery having increased longevity and volumetric capacity over batteries that contain a cathode that uses conventional conductive additives such as carbon black or graphite.

12 Claims, 1 Drawing Sheet

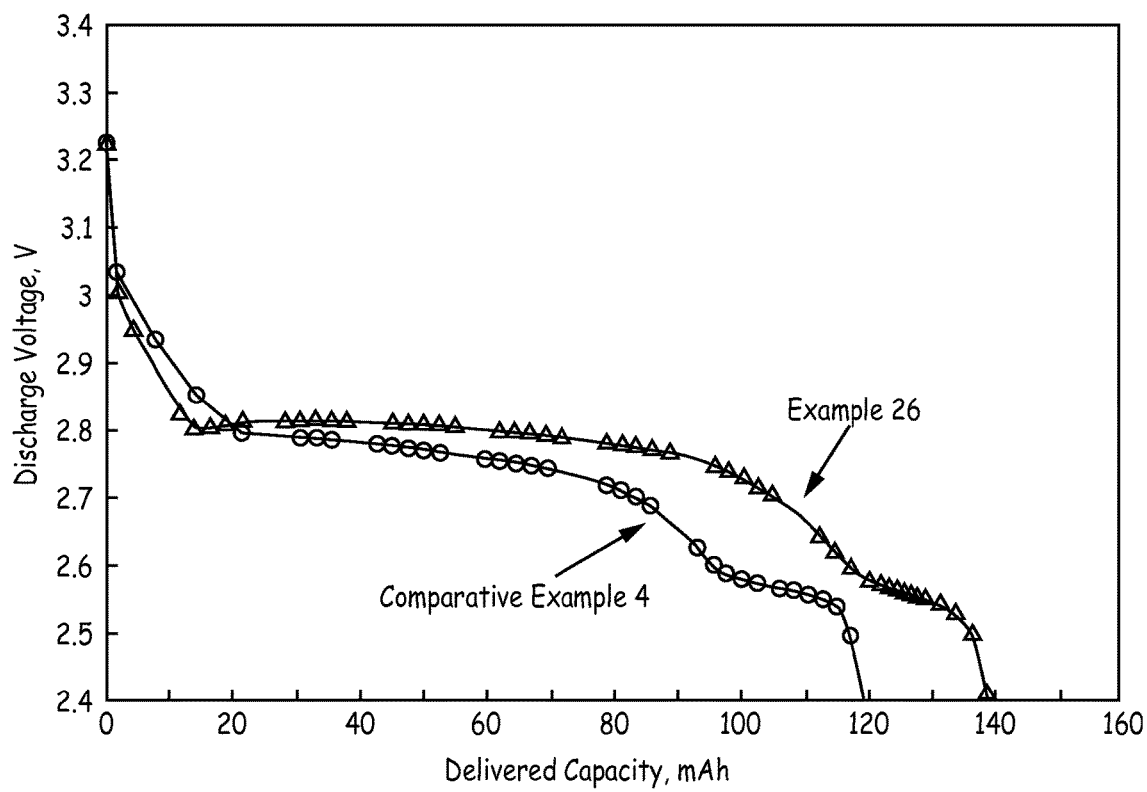

BATTERIES AND CATHODES CONTAINING CARBON NANOTUBES

BACKGROUND

The disclosure relates to cathodes that contain carbon nanotubes and batteries containing such cathodes.

Cathodes for batteries useful in implantable medical devices typically contain active materials, carbon black or graphite and polymeric binder. Such materials are typically mixed together and pressed to form a cathode. The combinations of active materials, carbon or graphite and binder are chosen to minimize volume and maximize the volumetric capacity of the cathode. As batteries for implantable medical devices decrease in size, a desire exists to increase the volumetric capacity of such batteries.

SUMMARY

In one embodiment, a battery comprises a lithium metal anode, an electrolyte, and a cathode containing carbon nanotubes, and a cathode active material selected from include silver vanadium oxide (SVO), carbon monofluoride (CFx), manganese dioxide ($MnO_2$), vanadium pentoxide ($V_2O_5$), copper fluoride ($CuF_2$) and copper silver vanadium oxide ($Cu_xAg_{2-x}V_4O_{11}$) and mixtures of all or any of them, the cathode active material being present in the cathode in an amount of at least 80% by weight.

In another embodiment, a cathode comprises carbon nanotubes and a cathode active material selected from include silver vanadium oxide (SVO), carbon monofluoride (CFx), manganese dioxide ($MnO_2$), vanadium pentoxide ($V_2O_5$), copper fluoride ($CuF_2$) and copper silver vanadium oxide ($Cu_xAg_{2-x}V_4O_{11}$) and mixtures of all or any of them, the cathode active material being present in the cathode in an amount of at least 80% by weight.

In another embodiment, a battery comprises a lithium metal anode, an electrolyte and a cathode comprising a cathode composition containing carbon nanotubes, carbon monofluoride (CFx) and silver vanadium oxide, the silver vanadium oxide and CFx combined being present the composition in an amount of at least 80% by weight of the composition.

In another embodiment, a cathode consists essentially of an active material selected from the group consisting of silver vanadium oxide (SVO), manganese dioxide ($MnO_2$), vanadium pentoxide ($V_2O_5$), copper silver vanadium oxide ($Cu_xAg_{2-x}V_4O_{11}$)), and copper fluoride ($CuF_2$) and mixtures of any of them, carbon monofluoride (CFx), and conductive additive consisting essentially of carbon nanotubes and carbon black or graphite or both, wherein the active material and the carbon monofluoride combined is present in an amount of at least 80% by weight.

In another embodiment, a battery consists essentially of an anode consisting essentially of lithium metal and a current collector, an electrolyte, a separator; and a cathode consisting essentially of carbon nanotubes, one or more active materials, carbon black or graphite or both carbon black and graphite, a binder, and a current collector.

In another embodiment, a battery consists essentially of an anode consisting essentially of lithium metal and a current collector, an electrolyte, a separator; and a cathode consisting essentially of CFx, SVO, carbon nanotubes, carbon black or graphite or both carbon black and graphite, a binder, and a current collector.

BRIEF DESCRIPTION OF THE DRAWINGS

FIG. 1 is a depiction of a plot of the Delivered Capacity versus Discharge Voltage for one embodiment composition of a battery compared to a sample of a known composition of a battery.

DETAILED DESCRIPTION

"Carbon nanotubes" includes single walled carbon nanotubes and multi-walled carbon nanotubes (MWNT) and mixtures of both.

Carbon monofluoride, often referred to as carbon fluoride, polycarbon monofluoride, CFx, or (CFx)n or graphite fluoride is a solid, structural, non-stoichiometric fluorocarbon of empirical formula CFx, wherein x is 0.01 to 1.9, 0.1 to 1.5, or 1.1. One commercially available carbon monofluoride is (CFx)n where 0<x<1.25 (and n is the number of monomer units in the polymer, which can vary widely).

Silver vanadium oxide includes compounds having the general formula $Ag_xV_yO_z$ wherein x=0 to 2; y=1 to 4; and z=4 to 11, for example, $AgV_2O_5$, $Ag_2V_4O_{11}$, $Ag_{0.35}V_2O_{5.8}$, $Ag_{0.74}V_2O_{5.37}$ and $AgV_4O_{5.5}$.

Applicant has discovered that the use of carbon nanotubes in cathode materials can provide a battery having increased longevity over batteries that contain a cathode that uses conventional conductive additives such as carbon black or graphite.

Applicant has found that the use of carbon nanotubes in place of carbon black or graphite in cathodes such as CFx/SVO cathodes allows for the use of higher amounts of active materials in a cathode composition while maintaining physical integrity, in the case of a pressed or pellet cathode. Particularly, the ratio of CFx (capacity of 786 mAh/g) active material to SVO (capacity of 270 mAh/g) active material can be increased when carbon nanotubes are used instead of graphite or carbon black. Applicant has found that the use of carbon black or graphite in cathodes where the CFx to SVO ratio is increased results in cathodes having higher resistance, lower physical integrity and lower density. The use of carbon nanotubes results in pressed cathodes having a desired density and conductivity to maximize stored capacity (mAh) and maintaining power capability (W/cm^2) and cathodes having a higher volumetric capacity than cathodes using the same active materials and binder, but containing carbon black or graphite conductive additive.

The electrochemical cells or batteries described in this application include a cathode (positive polarity), an anode (negative polarity), an electrolyte and a separator. The cathodes described in this application generally contain active materials, conductive additive and binder.

Active materials in the battery are the source of energy and power. Useful active materials include silver vanadium oxide (SVO), carbon monofluoride (CFx), manganese dioxide ($MnO_2$), vanadium pentoxide ($V_2O_5$), and copper silver vanadium oxide ($Cu_xAg_{2-x}V_4O_{11}$) and mixtures of all or any of them. In another embodiment, useful active materials consist essentially of silver vanadium oxide (SVO), carbon monofluoride (CFx), manganese dioxide ($MnO_2$), vanadium pentoxide ($V_2O_5$), copper silver vanadium oxide ($Cu_xAg_{2-x}V_4O_{11}$), and copper fluoride ($CuF_2$) and mixtures of all or any of them and do not include any other active materials. In another embodiment, active materials are selected from the group consisting of silver vanadium oxide (SVO), carbon monofluoride (CFx), manganese dioxide ($MnO_2$), vanadium pentoxide ($V_2O_5$), copper silver vanadium oxide ($Cu_xAg_{2-x}V_4O_{11}$) and copper fluoride ($CuF_2$) and mixtures of all or any of them and may be selected from a group consisting of any subgroup of the above group.

Conductive additives are used for improving the conductivity of the cathode. Useful conductive additives include carbon nanotubes as defined above and carbon black or graphite as a co-additive. In another embodiment, useful conductive additives consist essentially of carbon nanotubes and may contain carbon black or graphite or both as a co-additive and does not include any other conductive additives.

Binders are used to hold or bind all of the materials mixed together to form a solid cathode which holds its shape without cracking or breaking. Useful binders are typically polymers or polymeric materials. Useful binders include poly(tetrafluoroethylene) (PTFE), polyvinylidene fluoride (PVDF), styrene-butadiene rubber (SBR), and carboxymethyl cellulose (CMC).

Cathodes are typically made by combining one or more active materials, carbon nanotubes and a binder into a cathode composition and then pressing the composition onto a metallic current collector.

The anode is a metal and typically is or comprises lithium metal. The anode metal is typically pressed onto a metallic current collector. In another embodiment, the anode consists essentially of lithium metal pressed onto a metallic current collector and contains no other active anode material.

Separators are typically in the form of a film and are used to separate an anode from a cathode, but allow an electrolyte to permeate. Useful materials that can be used to make separators include polymer films such as polyethylene, polypropylene, poly(tetrafluoroethylene), and polyvinyl chloride, and nonwoven fibers such as nylon, polyesters and glass, and ceramics.

Useful electrolytes for use in the electrochemical cells described in this application are non-aqueous. The electrolyte may be a 1:1 mixture of propylene carbonate (PC) to dimethoxyethane (DME) in a 1.0 molar (M) lithium salt such as lithium hexafluoroarsenate (LiAsF6), or 1:1 mixture of ethylene carbonate (EC) to diethylene carbonate (DEC) (EC:DEC) in a 1.0 molar (M) salt of lithium hexafluorophosphate (LiPF6). The electrolyte may include a polypropylene carbonate solvent and a lithium bis-oxalatoborate salt (sometimes referred to as LiBOB). The electrolyte may include one or more of a polyvinylidene fluoride (PVDF) copolymer, a PVDF-polyimide material, and organosilicon polymer, a thermal polymerization gel, a radiation cured acrylate, a particulate with polymer gel, an inorganic gel polymer electrolyte, an inorganic gel-polymer electrolyte, a PVDF gel, polyethylene oxide (PEO), a glass ceramic electrolyte, phosphate glasses, lithium conducting glasses, lithium conducting ceramics, and an inorganic ionic liquid or gel, among others.

Current collectors are metallic and include those made from or comprising titanium, aluminum, nickel and combinations and alloys of any of them.

Cathode active materials are present in the cathode composition in an amount of at least 80% by weight. The cathode active materials are present in a cathode composition in an amount that ranges from 80% to 97% by weight, the range including any individual amount or any range of amounts within such range. In other embodiments, the cathode active materials are present in a cathode composition in an amount that ranges from 92% to 95% by weight, the range including any individual amount or any range of amounts within such range. In other embodiments, the cathode active materials are present in a cathode composition in an amount of at least 90% by weight or in an amount of at least 93% by weight.

Conductive additives, for example, carbon nanotubes are present in the cathode composition in an amount of from 1% to 10% by weight, the range including any individual amount or any range of amounts within such range. In other embodiments, conductive additives are present in the cathode composition in an amount of from 1% to 6% by weight, 2% to 5% by weight, and 2% to 4% by weight.

Binders are present in the cathode composition in an amount of from 1% to 15% by weight, the range including any individual amount or any range of amounts within such range. In other embodiments, binders are present in the cathode composition in an amount of from 3% to 10% by weight, 3% to 7% by weight, and 4% to 6% by weight.

In one example of a cathode composition, CFx is present in the cathode compositions described in this application in an amount of from 20 to 80 percent by weight of the cathode composition, and SVO is present in the cathode compositions described in this application in an amount of from 60 to 20 percent by weight, the ranges including any individual amount or any range of amounts within such range. The capacity ratio ((mAh/g) CFx/(mAh/g) SVO) of such compositions containing CFx and SVO active materials range from 1 to 1 to 10 to 1.

The cathode compositions described in this application are useful for making cathodes for batteries, for example batteries for use in medical devices.

EXAMPLES

Glossary:

| Abbreviation | Material | Comments |
|---|---|---|
| SVO | Silver Vanadium Oxide | $Ag_2V_4O_{11}$ |
| CFx | Carbon Mono fluoride | $CF_{1.0}$ |
| Carbon | Carbon black | Commercially available such as SUPER-P carbon black form TIMCAL America Inc. or acetylene black |
| CNT | Carbon Nanotubes | Multi-walled |
| Binder | Polytetrafluoroethylene (PTFE) | PTFE aqueous emulsion such as commercially available from Daikin Corporation. |

| Term | Definition | Determined |
|---|---|---|
| Specific Capacity | Capacity (mAh)/g cathode | Calculated |
| Capacity Ratio | Capacity (mAh/g) CFx/Capacity (mAh/g) SVO | Calculated |
| Pressed Density | g/cm³ | Calculated |
| Volumetric Capacity | mAh/cm³ | Calculated |
| Stored Capacity | Total available battery capacity (mAh) | Calculated |

Sample Preparation:

Cathode mixtures were generally prepared by mixing CFx, SVO, Carbon (or CNT) and Binder in water and isopropyl alcohol. The mixture was then heated at a temperature of 150° C. for 4 hours or longer to remove the water and isopropyl alcohol.

Example 1 and Comparative Example 1

Samples were prepared as described above having the compositions described below. Pellets were prepared by pressing 1 gram samples of each composition in a 0.625 in (15.9 mm) die at 4000 psi (27579 kPa) and resistance was measured using an LCR meter. Results are shown below in Table 1.

TABLE 1

| Sample | Composition (% by weight) | Resistance |
|---|---|---|
| CE 1 | 47% CFx, 46% SVO, 4% Binder, 3% Carbon | 19 ohm |
| EX 1 | 47% CFx, 46% SVO, 4% Binder, 3% CNT | 1.5 ohm |

Examples 2-3 and Comparative Example 2

Samples of cathode materials were prepared as described above having the compositions described below. One gram of each composition was pressed into a pellet as described above for Example 1. The volume of the pressed pellet was calculated from the measured dimensions (diameter and height). The specific capacity was calculated from the materials used in the composition. The volumetric capacities of the compositions were calculated using the specific capacity multiplied by the pressed density. Results are shown below in Table 2.

TABLE 2

| Sample | Description (% by weight) | Composition (% by weight) | Specific Capacity | Pressed Density | Volumetric Capacity |
|---|---|---|---|---|---|
| CE 2 | 90% active with Conventional carbon | 37% CFx, 53% SVO, 4% Carbon, 6% Binder | 434 mAh/g | 2.30 g/cm$^3$ | 998 mAh/cm$^3$ |
| EX 2 | 90% active with CNT | 37% CFx, 53% SVO, 4% CNT, 6% Binder | 434 mAh/g | 2.49 g/cm$^3$ | 1081 mAh/cm$^3$ |
| EX 3 | 93% active with CNT | 38% CFx, 55% SVO, 3% CNT, 4% Binder | 447 mAh/g | 2.49 gcm$^3$ | 1113 mAh/cm$^3$ |

Example 4 and Comparative Example 3

Samples of cathode materials were prepared as described above and having the following formulations (% by weight): EX 4—47% CFx, 46% SVO, 3% CNT, 4% Binder; CE 3—47% CFx, 46% SVO, 3% Carbon, 4% Binder. The formulations compare cathodes having a 3:1 Capacity Ratio of CFx:SVO and containing Carbon and CNT. Pellets of each composition were made by pressing about 0.3 g composition in a cylindrical die (0.2 in×0.3 in) (5.1 mm×7.6 mm), removed from the die and placed on a table. Visible cracks in the pellet made using the composition of CE 3 formed immediately after removal from the die as compared to no visible cracks in the pellet made from the composition of EX 4.

Examples 4-12

Samples of cathode materials were prepared as described above and pellets of each compositing were made as described above (1 g; 15.9 mm die). Each sample contained 93% by weight of active materials (CFx and SVO), but in different CFx to SVO ratios. Each sample was measured for Specific Capacity, Pressed Density, Volumetric Capacity, and Resistance. The results are shown below in Table 3.

TABLE 3

| Sample | CFx:SVO Capacity Ratio | Composition (% by weight) | Specific Capacity (mAh/g) | Pressed Density (g/cm$^3$) | Volumetric Capacity (mAh/cm$^3$) | Pellet Resistance (Ohm) |
|---|---|---|---|---|---|---|
| EX 4 | 2:1 | 38% CFx, 55% SVO, 3% CNT, 4% Binder | 447 | 2.49 | 1113 | 1.5 |
| Ex 5 | 3:1 | 47% CFx, 46% SVO, 3% CNT, 4% Binder | 494 | 2.28 | 1126 | 2 |
| EX 6 | 4:1 | 54% CFx, 39% SVO, 3% CNT, 4% Binder | 529 | 2.15 | 1137 | 1.7 |
| EX 7 | 5:1 | 59% CFx, 34% SVO, 3% CNT, 4% Binder | 555 | 2.05 | 1138 | 1.8 |
| EX 8 | 6:1 | 62.6% CFx, 30.4% SVO, 3% CNT, 4% Binder | 574 | 1.98 | 1137 | 2 |
| EX 9 | 7:1 | 65.7% CFx, 27.3% SVO, 3% CNT, 4% Binder | 590 | 1.93 | 1139 | 1.8 |
| EX 10 | 8:1 | 68.2% CFx, 24.8% SVO, 3% CNT, 4% Binder | 603 | 1.89 | 1140 | 1.7 |
| EX 11 | 9:1 | 70.3% CFx, 22.7% SVO, 3% CNT, 4% Binder | 614 | 1.86 | 1142 | 1.7 |
| EX 12 | 10:1 | 72% CFx, 21% SVO, 3% CNT, 4% Binder | 623 | 1.83 | 1140 | 1.6 |

Examples 13-25

Samples of cathode materials were prepared as described above and pellets of each compositing were made as described above (1 g; 15.9 mm die) with different CFx to SVO Capacity Ratios and different levels of percent Active materials (CFx and SVO). Each sample was measured for Specific Capacity, Pressed Density, Volumetric Capacity, and Resistance. The results are shown below in Table 4.

TABLE 4

| Sample | CFx:SVO Capacity Ratio | Active (% by weight) | Composition (% by weight) | Specific Capacity (mAh/g) | Pressed Density (g/cm$^3$) | Volumetric Capacity (mAh/cm$^3$) | Pellet Resistance Ohm |
|---|---|---|---|---|---|---|---|
| EX 13 | 3:1 | 93 | 47% CFx, 46% SVO, 3% CNT, 4% Binder | 494 | 2.28 | 1126 | 2 |
| EX 14 | 3:1 | 94 | 47.7% CFx, 46.3% SVO, 3% CNT, 3% Binder | 500 | 2.22 | 1110 | 1 |

TABLE 4-continued

| Sample | CFx:SVO Capacity Ratio | Active (% by weight) | Composition (% by weight) | Specific Capacity (mAh/g) | Pressed Density (g/cm$^3$) | Volumetric Capacity (mAh/cm$^3$) | Pellet Resistance Ohm |
|---|---|---|---|---|---|---|---|
| EX 15 | 3:1 | 95 | 48.2% CFx, 46.8% SVO, 3% CNT, 2% Binder | 505 | 2.22 | 1124 | 1.4 |
| EX 16 | 5:1 | 90 | 56.9% CFx, 33.1% SVO, 4% CNT, 6% Binder | 537 | 2.02 | 1085 | 1.2 |
| EX 17 | 5:1 | 92 | 58% CFx, 34% SVO, 3% CNT, 5% binder | 548 | 2.04 | 1107 | 2.1 |
| EX 18 | 5:1 | 93 | 58.8% CFx, 34.2% SVO, 3% CNT, 4% Binder | 555 | 2.05 | 1138 | 1.8 |
| EX 19 | 5:1 | 94 | 59.4% CFx, 34.6% SVO, 3% CNT, 3% Binder | 560 | 2.01 | 1126 | 1.2 |
| EX 20 | 5:1 | 95 | 60% CFx, 35% SVO, 3% CNT, 2% Binder | 566 | 1.98 | 1121 | 1.2 |
| EX 21 | 7:1 | 90 | 63.6% CFx, 26.4% SVO, 4% CNT, 6% Binder | 571 | 1.93 | 1102 | 1.2 |
| EX 22 | 7:1 | 92 | 65% CFx, 27% SVO, 3% CNT, 5% Binder | 582 | 1.92 | 1117 | 2.2 |
| EX 23 | 7:1 | 93 | 65.7% CFx, 27.3% SVO, 3% CNT, 4% Binder | 590 | 1.94 | 1145 | 2 |
| EX 24 | 7:1 | 94 | 66.4% CFx, 27.6% SVO, 3% CNT, 3% Binder | 596 | 1.9 | 1132 | 1.5 |
| EX 25 | 7:1 | 95 | 67.1% CFx, 27.9% SVO, 3% CNT, 2% Binder | 603 | 1.89 | 1140 | 2 |

Example 26 and Comparative Example 4

Samples were prepared as described above using the following formulations (% by weight): EX 26—47% CFx, 46% SVO, 3% CNT, 4% Binder and CE 4—37% CFx, 53% SVO, 4% Carbon, 6% Binder. Cathodes were made in dimensions described in Example 4 and Comparative Example 3 by pressing powders of the above formulations onto metallic current collectors. Lithium cells (small cylindrical cell) were built using the cathodes and a LiAsF6/PC/DME electrolyte. Example 26 had a Stored Capacity of 142 mAh and Comparative Example 4 had a Stored Capacity of 125 mAh.

Delivered Capacity (mAh) was plotted against Discharge Voltage (V) for each sample using a 100 micro-amp discharge at a temperature of 37° C. A graph showing the plotted results is shown in FIG. 1.

The data in FIG. 1 show the actual delivered capacity (as compared to the stored capacity based on the amount of cathode used). The data demonstrates the practical benefit based on a practical cell and the actual delivered capacity through discharge.

The invention claimed is:
1. A battery comprising:
   a lithium metal anode;
   an electrolyte; and
   a cathode comprising a cathode composition of silver vanadium oxide having the formula $Ag_2V_4O_{11}$, carbon monofluoride having the formula $CF_{1.0}$, a binder and conductive additive comprising carbon nanotubes, the silver vanadium oxide and $CF_{1.0}$ combined being present the composition in an amount of from 90 to 95% by weight of the composition, the carbon nanotubes being present in an amount of from 3% to 4% by weight of the cathode composition, and the binder being present in the composition in an amount of from 2% to 6% by weight of the composition, wherein the cathode composition has a carbon monofluoride to silver vanadium oxide capacity ratio of from 2:1 to 10:1.
2. The battery of claim 1, wherein the silver vanadium oxide and carbon monofluoride combined being present the cathode composition in an amount of at least 93% to 95% by weight of the cathode composition.
3. The battery of claim 1, wherein the carbon monofluoride is present in the cathode composition in an amount of from 20% to 80% by weight of the cathode composition.

4. The battery of claim 1, wherein the silver vanadium oxide is present in the cathode composition in an amount of from 60% to 20% by weight of the cathode composition.

5. The battery of claim 1, wherein the conductive additive consists essentially of carbon nanotubes.

6. The battery of claim 1, further comprising a separator.

7. The battery of claim 1 wherein the anode further comprises a metallic current collector.

8. The battery of claim 1 wherein the cathode further comprises a metallic current collector.

9. A cathode comprising:
silver vanadium oxide having the formula $Ag_2V_4O_{11}$;
a binder;
carbon monofluoride ($CF_{1.0}$); and
conductive additive comprising carbon nanotubes, wherein the active material and the carbon monofluoride combined is present in an amount of from 90 to 95% by weight, the carbon nanotubes being present in an amount of from 3% to 4% by weight of the cathode composition, and the binder being present in the composition in an amount of from 2% to 6% by weight of the composition, wherein the cathode composition has a carbon monofluoride to silver vanadium oxide capacity ratio of from 2:1 to 10:1.

10. The cathode of claim 9, wherein the active material and the carbon monofluoride combined is present in an amount of at least 93% to 95% by weight.

11. The cathode of claim 9, wherein the carbon monofluoride is present in an amount of from 20% to 80% by weight.

12. The cathode of claim 9 further comprising a metallic current collector.

* * * * *